United States Patent
Baradie et al.

(10) Patent No.: US 7,225,348 B2
(45) Date of Patent: May 29, 2007

(54) ELECTRICAL CIRCUIT HAVING COOPERATING COMPONENTS

(75) Inventors: Sammy Baradie, Munich (DE); Martin Kaibel, Munich (DE); Andreas Weisgerber, Feldkirchen-Westerham (DE)

(73) Assignee: Infineon Technologies AG (DE)

( * ) Notice: Subject to any disclaimer, the term of this patent is extended or adjusted under 35 U.S.C. 154(b) by 255 days.

(21) Appl. No.: 10/491,070

(22) PCT Filed: Sep. 25, 2002

(86) PCT No.: PCT/DE02/03646

§ 371 (c)(1),
(2), (4) Date: Oct. 18, 2004

(87) PCT Pub. No.: WO03/030008

PCT Pub. Date: Apr. 10, 2003

(65) Prior Publication Data

US 2005/0110549 A1 May 26, 2005

(30) Foreign Application Priority Data

Sep. 28, 2001 (DE) .............................. 101 48 134

(51) Int. Cl.
*G06F 1/00* (2006.01)
(52) U.S. Cl. ...................................... 713/322; 327/291
(58) Field of Classification Search ................ 713/322; 327/291
See application file for complete search history.

(56) References Cited

U.S. PATENT DOCUMENTS

| 4,217,637 A | * | 8/1980 | Faulkner et al. ............ 713/501 |
|---|---|---|---|
| 4,757,439 A | | 7/1988 | Stinson et al. |
| 4,941,157 A | | 7/1990 | Taylor |
| 5,265,243 A | * | 11/1993 | Povenmire et al. ........... 710/62 |
| 5,491,814 A | | 2/1996 | Yee et al. |
| 5,498,981 A | * | 3/1996 | Fukushige .................... 326/93 |
| 5,680,594 A | * | 10/1997 | Charneski et al. .......... 713/501 |
| 5,796,995 A | * | 8/1998 | Nasserbakht et al. ....... 713/503 |
| 5,850,541 A | * | 12/1998 | Sugimoto .................... 713/601 |
| 5,862,373 A | * | 1/1999 | Pathikonda et al. ........ 713/501 |
| 5,960,053 A | | 9/1999 | Seo et al. |

(Continued)

FOREIGN PATENT DOCUMENTS

DE  27 09 773 A1  9/1977

(Continued)

*Primary Examiner*—Thomas Lee
*Assistant Examiner*—Vincent Tran
(74) *Attorney, Agent, or Firm*—Dickstein, Shapiro, LLP.

(57) ABSTRACT

An electrical circuit including components which cooperate with each other, in which a component of the electrical circuit which is waiting for an action to be carried out by another component, is notified by an acknowledgement signal shortly before the implementation of the action that implementation of the action is imminent. The electrical circuit optionally includes a clock generator containing a master clock generator, a clock control unit and several clock signal producing units. The master clock generator produces a master clock signal which is supplied to all of the clock signal producing units. The clock control unit produces several release signals that are respectively supplied to each clock signal producing unit. Each clock signal producing unit passes part of the master clock signal in response to the received release signal, and transfers the passed signal as a clock signal to at least one component of the electrical circuit.

32 Claims, 3 Drawing Sheets

U.S. PATENT DOCUMENTS

| | | |
|---|---|---|
| 5,964,856 A | 10/1999 | Wu et al. |
| 5,969,550 A | 10/1999 | Hintukainen |
| 6,047,346 A | 4/2000 | Lau et al. |
| 6,118,314 A * | 9/2000 | Arnould et al. ............. 327/141 |
| 6,211,715 B1 | 4/2001 | Terauchi |
| 6,247,089 B1 * | 6/2001 | Kuo et al. .................. 710/309 |
| 6,266,779 B1 * | 7/2001 | Kurd .......................... 713/500 |

FOREIGN PATENT DOCUMENTS

| | | |
|---|---|---|
| DE | 39 31 382 C1 | 11/1990 |
| EP | 0 733 979 A2 | 9/1996 |
| GB | 2 294 561 A | 5/1996 |

* cited by examiner

ELECTRICAL CIRCUIT HAVING COOPERATING COMPONENTS

FIELD OF THE INVENTION

The present invention relates to an electrical circuit with components which cooperate with one another.

BACKGROUND OF THE INVENTION

In electrical circuits such as these, the components which cooperate with one another frequently do not have the same performance, and in particular they do not operate at the same speed.

One electrical circuit in which this is frequently the case is, by way of example but as is known by no means exclusively, a programmable unit such as a microcontroller.

Figure 1:
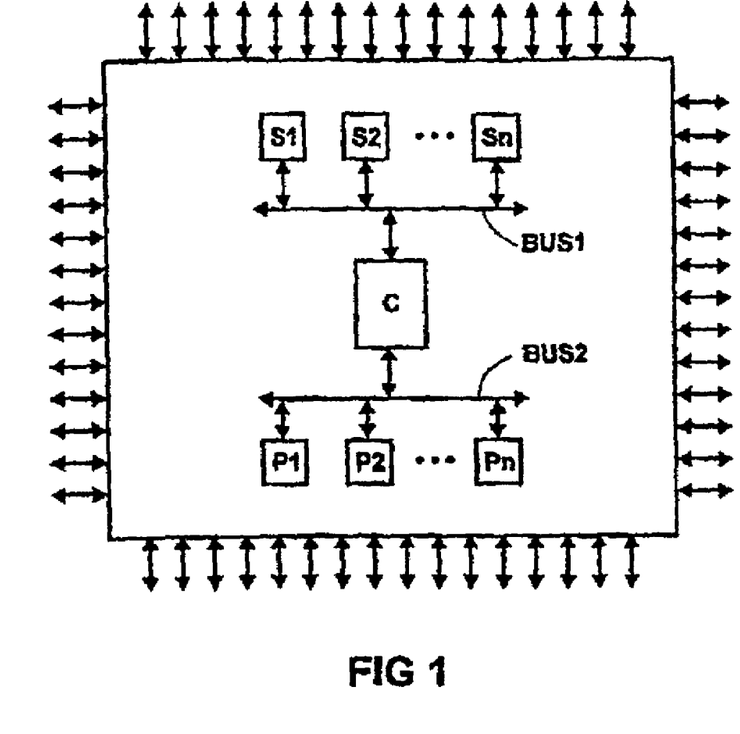
FIG. 1 shows the basic design of a known electrical circuit with components which cooperate with one another.

FIG. 1 shows the fundamental design of a microcontroller. The illustrated microcontroller contains a core C, memory devices S1 to Sn which are connected to the core C via a first bus BUS1, and periphery units P1 to Pn which are connected to the core C via a second bus BUS2.

The memory devices S1 to Sn are, for example, a RAM, a ROM, a flash memory, etc.

The periphery units are, for example, an A/D converter a DMA controller, a coding device, a CAN controller, etc.

The core C
reads commands and operands which are stored in the memory devices S1 to Sn or in an external memory device which is provided outside the microcontroller, and carries out these commands and operands,
and in the process cooperates in a predetermined manner with the memory devices S1 to Sn and with the periphery units P1 to Pn.

Microcontrollers are clock-controlled devices, with the speed at which the microcontroller operates (for example how quickly it carries out the program to be carried out by it) depending inter alia on the frequency of the clock signal that is used.

The higher the clock signal frequency, the faster the microcontroller operates.

On the other hand, however, high clock signal frequencies lead to a high power consumption and to the disadvantages associated with this such as severe heating, as well as the production of electromagnetic radiation, etc.

In order to keep these disadvantages within bounds, efforts are being made to ensure that the various components of the microcontroller each run only as fast as is necessary for correct operation of the microcontroller. This is generally achieved by producing a number of clock signals at different frequencies in the microcontroller, and by supplying these different clock signals to the various components. This makes it possible, for example, to supply the core C with a very high-frequency clock signal, and to supply specific periphery units, such as a D/A converter, with a clock signal at a lower clock frequency, for example with a clock signal at half the clock frequency.

However, the fact that certain components of the microcontroller are supplied with a clock signal at a lower frequency influences not only the relevant components themselves but can also influence components which are supplied with a clock signal at a high frequency. This is the case, for example, when a component which operates at a high clock frequency, that is to say by way of example the core C, wishes to transmit data to a component which is operating at a lower clock frequency, for example to the D/A converter. In this case, the core C must produce the data to be transmitted for a longer time at its outputs than would be the case if the receiver of the data were a component which was operating at the same clock frequency as the core C. This is due to the fact that the clock edges by means of which the D/A converter can accept data occur at comparatively long time intervals, and because the core C must furthermore continue to provide the data to be transferred until the D/A converter has acknowledged correct reception of the data, in which case the acknowledgement process also takes a certain amount of time owing to the necessity to synchronize the core and the D/A converter by means of flipflops or the like which are arranged between them. The core C can thus be blocked for a greater or lesser time as a result of which, overall, it operates more slowly than would be possible on the basis of its clock frequency.

At least some of the problems which have been mentioned can be overcome by operating the components alternately using clock signals at different frequencies. However, the production of clock signals at different frequencies and passing these clock signals to the components that use them are associated with a high degree of complexity, and are likewise also associated with considerable disadvantages.

SUMMARY OF THE INVENTION

The present invention is therefore directed to methods and structures for carrying out the operation and/or the cooperation between the components of an electrical circuit more efficiently and in a simpler manner than has been the case until now.

The electrical circuit according to the invention is distinguished
in that a component of the electrical circuit, which is waiting for the carrying out of an action to be carried out by another component, is signaled by means of an acknowledgement signal shortly before the carrying out of the relevant action that the carrying out of the action is imminent, and/or
in that the electrical circuit contains a clock generator for production of clock signals for the components of the electrical circuit, with this clock generator containing a master clock generator, a clock control device and two or more clock signal generating devices, and with
the master clock generator producing a master clock signal and supplying this to all the clock signal generating devices,
the clock control device producing two or more enable signals, and each clock signal generating device being supplied with an enable signal, and
each of the clock signal generating devices allowing a proportion of the master clock signal which is governed by the enable signal to pass, and this signal being passed on as the clock signal to one or more components of the electrical circuit.

Since acknowledgement signals which signal that a respective action will be carried out even before it is carried out are used, the time which a component which is waiting for this action to be carried out has to wait can be reduced to the minimum necessary time.

The clock signal production allows the required clock signals to be produced and changed particularly easily. Furthermore, it is possible with particularly little complexity to ensure that where they are used, that is to say in each of the components in the electrical circuit, the clock signals have a specific phase angle with respect to the clock signals that are used by each of the other components.

Advantageous developments of the invention are described in the dependent claims, in the following description and in the figures.

BRIEF DESCRIPTION OF THE DRAWINGS

The invention will be described in the following text using an exemplary embodiment and with reference to the figures, in which.

DESCRIPTION OF A PREFERRED EXEMPLARY EMBODIMENT

The electrical circuit which is described in the following text is a clock-controlled electrical circuit, to be more precise a programmable unit such as a microcontroller, a microprocessor or a signal processor.

However, it should be mentioned even at this point that the special features of the programmable unit which are described in the following text can also be used for any other electrical circuits with components which cooperate with one another.

Figure 2:
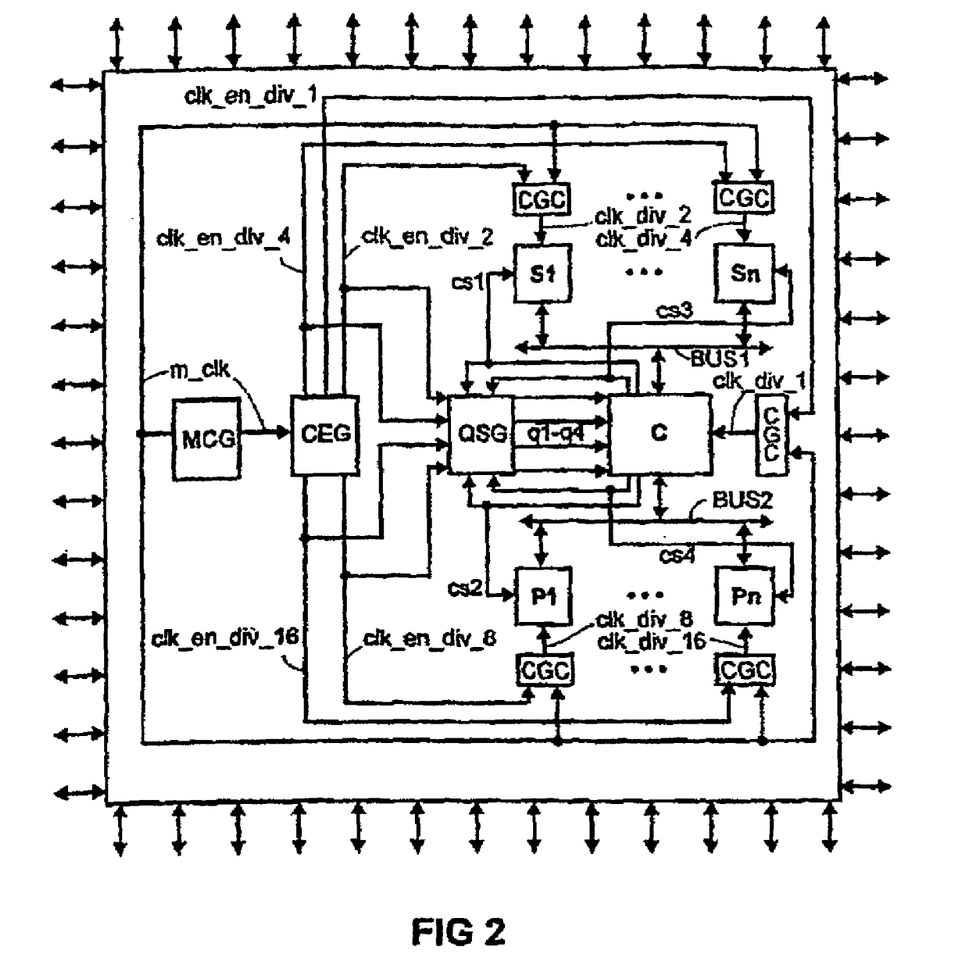
FIG. 2 shows the design of the electrical circuit which will be described in more detail in the following text.

The design of the programmable unit described in the following text is illustrated in FIG. 2.

The programmable unit which is shown in FIG. 2 contains:
a core C,
memory devices S1 to Sn which are connected to the core C via a first bus BUS1,
peripheral units P1 to Pn which are connected to the core C via a second bus BUS2,
a large number of clock signal generating devices CGC,
a clock generator MCG, which is referred to in the following text as a master clock generator,
a clock control device CEG, and
an acknowledgement signal generator QSG.

The programmable unit which is shown in FIG. 2 essentially operates in the same way as the programmable unit shown in FIG. 1. This means that the core C
reads commands and operands which are stored in the memory devices S1 to Sn or in an external memory device which is provided outside the microcontroller, and carries out these commands and operands,
and in the process cooperates in a predetermined manner with the memory devices S1 to Sn and with the periphery units P1 to Pn.

In contrast, the differences are the way in which the individual components of the programmable unit are supplied with clock signals, and the way in which the individual components of the programmable unit cooperate with one another.

In the example under consideration, the core C, the memory device S1, the memory device Sn, the peripheral unit P1, and the peripheral unit Pn operate with clock signals at a different frequency, and each of the components which have been mentioned has its own associated clock signal generating device CGC. Components which operate with clock signals at the same frequency may have a single associated common clock signal generating device CGC, particularly if the relevant components are located close to one another; components which operate with a clock signal whose frequency is the same as the frequency of the clock signal which is produced by the master clock generator MCG do not require their own clock signal generator device CGC and make direct use of the clock signal which is produced by the master clock generator MCG.

The individual components of the programmable unit are supplied with clock signals by the master clock generator MCG, by the clock control device CEG and by the clock signal generator devices CGC.

The master clock generator MCG produces a master clock signal m_clk which is supplied to all the clock signal generating devices CGC and to the clock control device CEG. This master clock signal m_clk is a square-wave signal at a predetermined constant frequency. This master clock signal m_clk is distributed in such a way that it preferably has the same phase angle in all the components to which it is supplied, but at least in those clock signal generating devices CGC which are associated with components of the programmable unit which cooperate with one another, taking into account the acknowledgement signals which will be described in more detail later.

The clock signal generating devices CGC are furthermore each supplied with a signal which is produced by the clock control device CEG and which is referred to in the following text as an enable signal, to be precise,
an enable signal clk_en_div_1 is supplied to the clock signal generating device CGC which is associated with the core C,
an enable signal clk_en_div_2 is supplied to the clock signal generating device CGC which is associated with the memory device S1,
an enable signal clk_en_div_4 is supplied to the clock signal generating device CGC which is associated with the memory device Sn,
an enable signal clk_en_div_8 is supplied to the clock signal generating device CGC which is associated with the peripheral unit P1, and
an enable signal clk_en_div_16 is supplied to the clock signal generating device CGC which is associated with the peripheral unit Pn.

The clock signal generating devices CGC use the signals which are supplied to them to produce clock signals which are supplied to the components which are associated with the respective clock signal generating devices CGC and are used by them as clock signals.

In this case:
the clock signal generating device CGC which is associated with the core C uses the signals m_clk and clk_en_div_1 which are supplied to it to produce a clock signal clk_div_1 which corresponds to the master clock signal m_clk,
the clock signal generating device CGC which is associated with the memory device S1 uses the signals m_clk and clk_en_div_2 which are supplied to it to produce a clock signal clk_div_2 whose frequency is half as great as the frequency of the master clock signal m_clk,
the clock signal generating device CGC which is associated with the memory device Sn uses the signals m_clk and clk_en_div_4 which are supplied to it to produce a clock signal clk_div_4 whose frequency is one quarter of the frequency of the master clock signal m_clk, the clock signal generating device CGC which is associated with the peripheral unit P1 uses the signals m_clk and clk_en_div_8 which are supplied to it to produce a clock signal clk_div_8 whose frequency is one eighth of the frequency master clock signal m_clk, and the clock signal generating device CGC which is associated with the peripheral unit Pn uses the signals m_clk and clk_en_div_16 which are supplied to it to produce a clock signal clk_div_16 whose frequency is one sixteenth of the frequency of the master clock signal m_clk.

For the sake of completeness, it should be mentioned that there is no need to supply the core C with the clock signal clk_div_1, to supply the memory device S1 with the clock signal clk_div_2, to supply the memory device Sn with the clock signal clk_div_4, to supply the peripheral unit P1 with the clock signal clk_div_8 and to supply the peripheral unit Pn with the clock signal clk_div_16; in principle, each of the components of the programmable unit may be supplied with any desired clock signal from the clock signals clk_div_1, clk_div_2, clk_div_4, clk_div_8, and clk_div_16, to be precise irrespective of which clock signals are supplied to each of the other components.

Furthermore, there is no restriction to the frequencies of the clock signals clk_div_1, clk_div_2, clk_div_4, clk_div_8, and clk_div_16 each differing by a factor of 2. The magnitude ratios of the frequencies of the clock signals clk_div_1, clk_div_2, clk_div_4, clk_div_8, and clk_div_16 may in principle assume any desired values independently of one another. However, it is preferable for the components of the programmable unit which may be connected to one another to be supplied with clock signals which are produced in such a way that the corresponding edge occurs at the time at which an edge occurs in one clock signal, even in the clock signals which are at the same frequency or at a higher frequency. This makes it possible in a particularly simple manner to allow the components of the programmable unit to cooperate using acknowledgement signals which will be described in more detail later.

The clock signal generating devices CGC and the components of the programmable unit which use the clock signals that are produced by them are arranged such that there are no delay time differences, or at worse negligibly small delay time differences, during the transmission of the clock signals that are produced by the clock signal generating devices to the respectively associated components.

The enable signals which are emitted from the clock control device CEG
in each case suddenly change from the level 0 to the level 1 one clock period of the master clock signal m_clk before the time at which the signal that is produced by the clock signal generating devices CGC is intended to have a rising edge, and
maintain this state for a time which corresponds to the duration of one clock period of the signal m_clk and then suddenly change back to the level 0.

Figure 3:
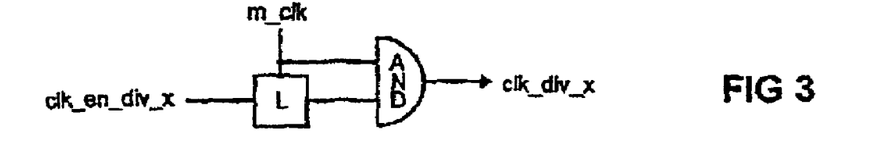
FIG. 3 shows the design of a clock signal generating device for the electrical circuit shown in FIG. 2.

FIG. 3 shows the design of a clock signal generating device CGC which contains a latch element L and an AND gate AND. As its input signal, the latch element L receives the enable signal clk_en_div_x that is emitted from the clock control device CEG, and accepts this with the rising edge of the master clock signal m_clk. The AND gate AND receives as its input signals the output signal from the latch element L and the master clock signal m_clk, subjects these signals to an AND operation, and in the process produces the output signal clk_div_x from the clock signal generating device CGC.

Figure 4:
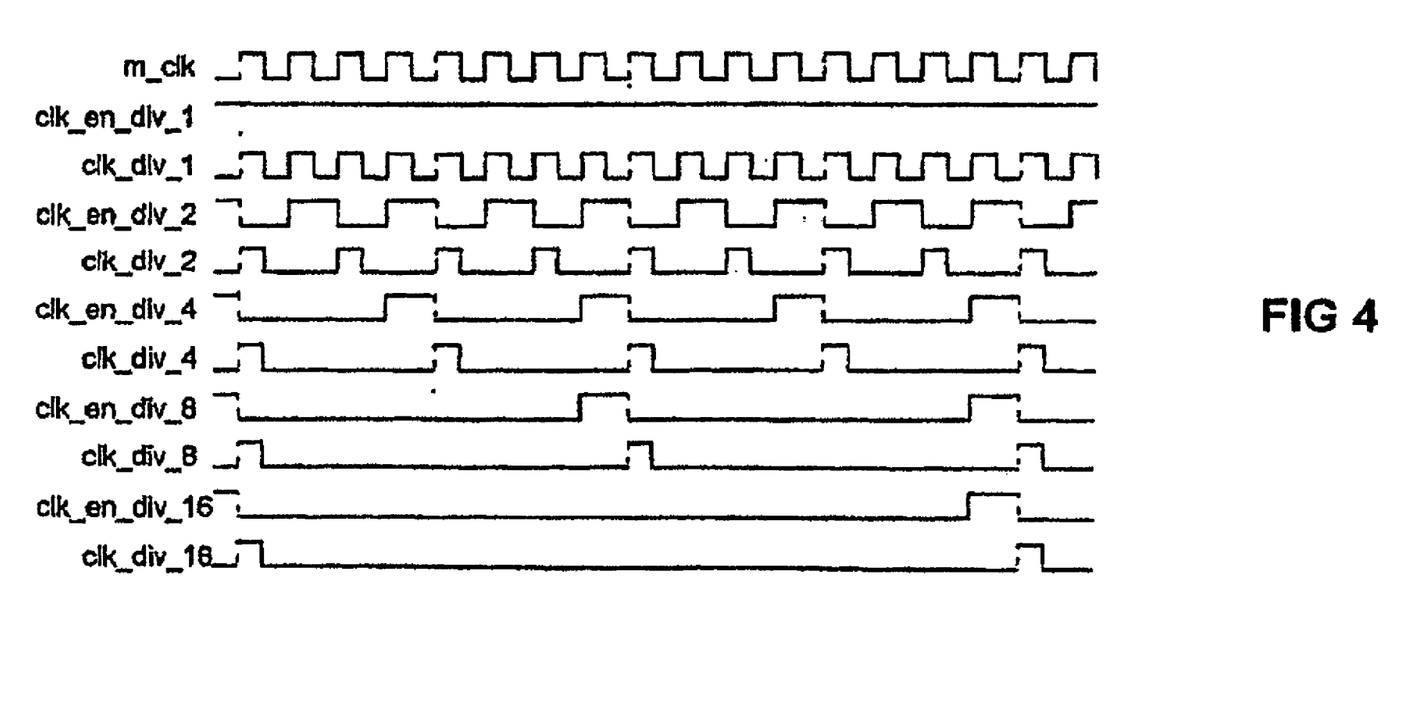
FIG. 4 shows the time profile of the output signals of a master clock generator, of a clock control device, and of the clock signal generating devices for the electrical circuit shown in FIG. 2.

The time profiles of the signals mentioned above are illustrated in FIG. 4.

As is evident from the explanatory notes above, the various clock signals clk_div_x are produced by selectively masking out specific sections of the master clock signal m_clk. Therefore, and because this master clock signal m_clk is supplied in such a way that it has the same phase angle in all of the components to which it is supplied, that is to say in all of the clock signal generating devices CGC, and because there are no delay time differences, or in any case no significant delay time differences, during the transmission of the clock signals clk_div_x to the components which use them, the components of the programmable unit which are supplied with the clock signals clk_div_x operate completely synchronously in all circumstances. This is true even when one, two or more or all of the enable signals clk_en_div_x which are emitted from the clock control device CEG are shifted backwards in time as a result of problems in the production and/or as a result of different delay times within the programmable unit. As is evident from the design of the clock signal generating devices CGC illustrated in FIG. 3 and described with respect to this figure, changes in the clock signals clk_div_x which are produced by the clock signal generating devices CGC occur only when the enable signals clk_en_div_x which are emitted from the clock control device CEG are shifted backwards by a time which corresponds to one clock period of the master clock signal m_clk, or more.

Irrespective of this, the frequencies of the clock signals clk_div_x can be changed very easily at any time, even during operation of the programmable unit. All that is necessary to do this is to appropriately modify the enable signals clk_en_div_x (which govern the frequencies of these signals) for the clock control device CEG.

The enable signals clk_en_div_x may be produced using counters which count the clock periods of the master clock signal m_clk and initiate changes to the level of the enable signals clk_en_div_x when specific counts are reached. In consequence, the frequencies of the clock signals clk_div_x can be changed simply by appropriate readjustment of the counters, and the timing of the enable signals clk_en_div_x can once again also be varied within certain limits in this case.

The enable signals clk_en_div_x which are emitted by the clock control device CEG are also supplied to the acknowledgement signal generator QSG.

The acknowledgement signal generator QSG is also supplied with chip select signals which are annotated cs1 to cs4. The chip select signals are signals which the core C outputs and which are supplied to the memory device S1 (chip select signal cs1), to the memory device Sn (chip select signal cs3), to the peripheral unit P1 (chip select signal cs2) and to the peripheral unit Pn (chip select signal cs4) via separate lines (which are not part of the buses BUS1 and BUS2), in order to signal to them that the core C wishes to communicate with the respective relevant unit.

The acknowledgement signal generator QSG uses the signals supplied to it to form acknowledgement signals q1 to q4, which are supplied to the core C.

Figure 5:
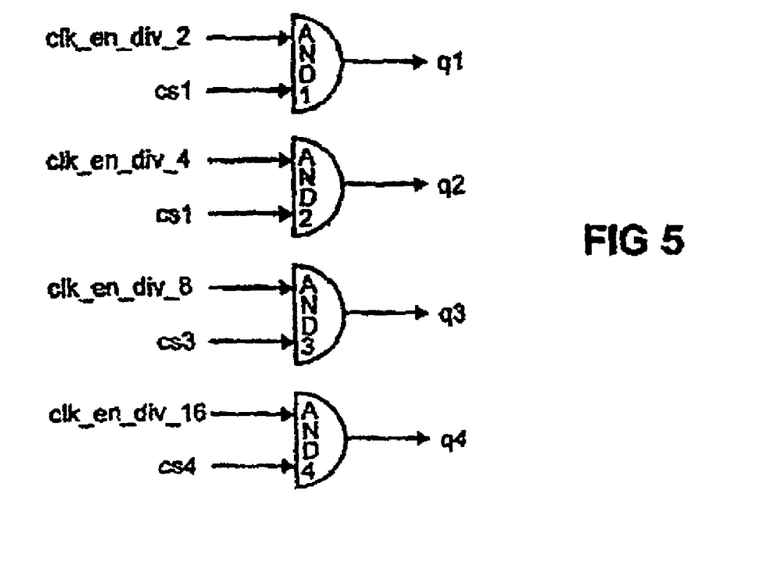
FIG. 5 shows the design of an acknowledgement signal generator for the electrical circuit shown in FIG. 2.

FIG. 5 shows the design of the acknowledgement signal generator, which comprises AND gates AND1 to AND4, with the AND gate AND1 subjecting the chip select signal cs1 which is associated with the memory device S1 and the enable signal clk_en_div_2 which is associated with the memory device S1 to AND linking, and using the signal which results from this as the acknowledgement signal q1, which is output to the core C the AND gate AND2 subjecting the chip select signal cs2 which is associated with the memory device Sn and the enable signal clk_en_div_4 which is associated with the memory device Sn to AND linking, and using the signal which results from this as the acknowledgement signal q2, which is output to the core C the AND gate AND3 subjecting the chip select signal cs3 which is associated with the peripheral unit P1 and the enable signal clk_en_div_8 which is associated with the peripheral unit P1 to AND linking, and using the signal which results from this as the acknowledgement signal q3, which is output to the core C, and the AND gate AND4 subjecting the chip select signal cs4 which is associated with the peripheral unit Pn and the enable signal clk_en_div_16 which is associated with the peripheral unit Pn to AND linking, and using the signal which results from this as the acknowledgement signal q4, which is output to the core C.

In consequence, the core C is signaled by the acknowledgement signal q1 that the occurrence of a rising edge in the clock signal which is used by the memory device S1 is imminent, is signaled by the acknowledgement signal q2 that the occurrence of a rising edge in the clock signal which is used by the memory device Sn is imminent, is signaled by the acknowledgement signal q3 that the occurrence of a rising edge in the clock signal which is used by the peripheral unit P1 is imminent, and is signaled by the acknowledgement signal q4 that the occurrence of a rising edge in the clock signal which is used by the peripheral unit Pn is imminent.

If the core C is actually waiting for the component selected by one of the chip select signals to carry out a specific action when the next rising edge occurs, then the core C can use the acknowledgement signal as advanced confirmation of this action being carried out, and can end the waiting process.

The advantages of this procedure can be illustrated by an example:

Let us assume that the core C wishes to transmit data to the peripheral unit P1. In this situation, the core C signals to the peripheral unit P1 via the chip select signal cs2 that the core C wishes to communicate with it via the bus BUS2, and applies the data to be transmitted to the peripheral unit P1 to the bus BUS2. The peripheral unit P1 can accept this data on the next rising clock edge of the clock signal clk_div_8 which is used by it. Let us assume that this rising edge coincides with the rising edge of the clock cycle No. n of the clock signal m_clk which is used by the core. The core C then in fact receives the acknowledgement signal q3 in the clock cycle No. n-1. The acknowledgement signal q3 signals to the core C that the data output from it on the bus will be accepted by the peripheral unit in the next clock cycle, that is to say in the clock cycle No. n. The core C can thus in fact end the outputting of the data at the start of the clock cycle No. n, and can continue to carry out the program.

In the case of a conventional programmable unit, for example in the case of the programmable unit illustrated in FIG. 1 and already described in the introduction with reference to this figure, the outputting of the data to be transmitted to the peripheral unit P1 would have to be continued for a longer period, to be more precise would have to be continued until the peripheral unit has confirmed reception of the data.

It should be evident and requires no further explanation that the generation and use of acknowledgement signals as described above is also advantageous in other situations in which the core C is waiting for a specific action to be carried out by one of the memory devices or peripheral units.

The core C can operate more quickly by the generation and use of the acknowledgement signals and, furthermore, there is no need for the components of the programmable unit which are communicating with one another to carry out a handshake process.

It may also be found to be advantageous for the peripheral units and/or the memory devices also to be supplied with appropriate acknowledgement signals, to be more precise with the enable signal clk_en_div_x for that component with which the relevant peripheral unit or memory device is currently communicating. The generation and use of acknowledgement signals has always been found to be advantageous when the component to which it is being supplied uses a clock of the same speed as or which is faster than the component with which it is currently communicating.

It should be evident that the way in which the acknowledgement signals are generated and used may be modified in many ways.

For example, it would be possible to provide for the number of acknowledgement signals to be minimized. In the example under consideration, it would be possible in this case, for example, to subject the acknowledgement signals q1 and q2 and the acknowledgement signals q3 and q4 to an OR logic operation, and to use the results of the OR logic operations as acknowledgement signals. This would then result in there being only two acknowledgement signals instead of four. This reduction in the number of acknowledgement signals is not disadvantageous in the example under consideration because the two peripheral units can never communicate with the core at the same time, and because the two memory devices can never communicate with the core at the same time either.

It would also be possible to dispense with the acknowledgement signal generator QSG and to supply the core, the peripheral units and/or the memory devices directly with the enable signals clk_en_div_x for each of the other components with which they can communicate.

The special features described above allow the operation and/or the cooperation of components in an electrical circuit to be carried out considerably more efficiently, and in a simple manner, than is the case with conventional electrical circuits.

LIST OF REFERENCE SYMBOLS

AND AND gate
BUSx Bus
C Core
CEG Clock control device
CGC Clock signal generating device
clk_div_x Output signal from CGC; clock signal
clk_en_div_x Output signal from CEG; enable signal
csx Chip select signal
L Latch element
MGC Master clock generator
m_clk Output signal from MCG; master clock signal
Px Periphery units
qx Acknowledgement signal
QSG Acknowledgement signal generator
Sx Memory devices

We claim:

1. An electrical circuit comprising:
   a plurality of clock-controlled components which cooperate with one another; and
   means for signaling a first component of the electrical circuit, which is waiting for a second component of the electrical circuit to perform an action, by producing an acknowledgement signal before the performance of the action, that the performance of the action is imminent, wherein the acknowledgement signal is produced by logic linking of a signal, on the basis of which the clock signal is produced, which is used by the second component, and a selection signal supplied by the first component to the second component in order to signal to the second component that the first component wishes to communicate with the second component.

2. The electrical circuit as claimed in claim 1, wherein at least some of the components of the electrical circuit operate with different clock signals.

3. The electrical circuit as claimed in claim 2, wherein the clock signal, with which the second component operates is at the same or a lower frequency than the clock signal with which the first component operates.

4. The electrical circuit as claimed in claim 1, wherein the acknowledgement signal is produced during the period of the clock signal which is used by the first component, within which period or following which period the action which is being waited for by the first component is carried out.

5. The electrical circuit as claimed in claim 1, wherein the acknowledgement signal is produced during the period of the clock signal which is used by the first component, within which period or following which period the edge of the clock signal which is used by the second component occurs, on whose occurrence the action is carried out.

6. The electrical circuit as claimed in claim 1, wherein the first component uses the acknowledgement signal as confirmation that the action which is being waited for is expected to be carried out.

7. The electrical circuit as claimed in claim 1, wherein the acknowledgement signal is formed by a component of the electrical circuit which is not identical to the second component.

8. The electrical circuit as claimed in claim 1, wherein the electrical circuit is an integrated circuit.

9. The electrical circuit as claimed in claim 1, wherein the electrical circuit is a programmable unit.

10. An electrical circuit comprising:
    a plurality of components which cooperate with one another;
    means for signaling a first component of the electrical circuit, which is waiting for a second component of the electrical circuit to perform an action, by producing an acknowledgement signal before the performance of the action, that the performance of the action is imminent; and
    a clock generator for production of clock signals for the components of the electrical circuit, with this clock generator containing a master clock generator, a clock control device, and two or more clock signal generating devices,
    wherein
        the master clock generator produces and supplies a master clock signal to all the clock signal generating devices,
        the clock control device produces two or more enable signals and each clock signal generating device is supplied with an enable signal, and
        each of the clock signal generating devices allows a fraction of the master clock signal which is governed by the enable signal to pass, and this signal is passed on as the clock signal to one or more components of the electrical circuit.

11. The electrical circuit as claimed in claim 10, wherein the master clock signal is supplied to the clock signal generating devices such that it reaches all of the clock signal generating devices with the same phase angle.

12. The electrical circuit as claimed in claim 10, wherein the enable signal which is produced by the clock control device is at a different level for a certain time than would otherwise be the case before the time at which the clock signal that is to be produced taking into account this enable signal is intended to have a specific edge.

13. The electrical circuit as claimed in claim 10, wherein the clock signal generating devices each contain a latch element and an AND gate,
    with the latch element accepting the instantaneous level of the enable signal with the rising edge of the master clock signal,
    with the AND gate carrying out AND linking of the output signal from the latch element and of the master clock signal, and
    with the output signal from the AND gate being used as the clock signal which is to be produced by the clock signal generating device.

14. The electrical circuit as claimed in claim 10, wherein the acknowledgement signal is formed taking into account the enable signal.

15. The electrical circuit as claimed in claim 9, wherein the component of the programmable unit to which the acknowledgement signal is supplied is the core of the programmable unit.

16. An electrical circuit comprising:
    a plurality of components which cooperate with one another; and
    a clock generator for production of clock signals for the components of the electrical circuit, wherein this clock generator includes a master clock generator, a clock control device and two or more clock signal generating devices, wherein:
        the master clock generator produces a master clock signal and supplies the master clock signal to all of the clock signal generating devices,
        the clock control device produces two or more enable signals, each of the clock signal generating devices is supplied with an enable signal, and
        each of the clock signal generating devices includes means for allowing a fraction of the master clock signal which is governed by the enable signal to pass, this fraction of the master clock signal is passed on as the clock signal to one or more components of the electrical circuit, and the clock signal generating devices each contain a latch element and an AND gate,
    with the latch element accepting the instantaneous level of the enable signal with the rising edge of the master clock signal,
    the AND gate carrying out AND linking of the output signal from the latch element and of the master clock signal, and
    the output signal from the AND gate being used as the clock signal which is to be produced by the clock signal generating device.

17. An electrical circuit comprising:
a plurality of components which cooperate with one another; and
a clock generator for production of clock signals for the components of the electrical circuit, wherein this clock generator includes a master clock generator, a clock control device and two or more clock signal generating devices, wherein:
the master clock generator produces a master clock signal and supplies the master clock signal to all of the clock signal generating devices,
the clock control device produces two or more enable signals, and each clock signal generating device is supplied with an enable signal, and
each of the clock signal generating devices includes means for allowing a fraction of the master clock signal which is governed by the enable signal to pass, wherein this signal is passed on as the clock signal to one or more components of the electrical circuit, and
wherein a component of the electrical circuit, which is waiting for the carrying out of an action to be carried out by another component, is signaled by means of an acknowledgement signal before the carrying out of the relevant action that the carrying out of the action is imminent.

18. The electrical circuit as claimed in claim 17, wherein the master clock signal is supplied to the clock signal generating devices such that it reaches all of the clock signal generating devices with the same phase angle.

19. The electrical circuit as claimed in claim 17, wherein the enable signal which is produced by the clock control device is at a different level for a certain time than would otherwise be the case before the time at which the clock signal that is to be produced taking into account this enable signal is intended to have a specific edge.

20. The electrical circuit as claimed in claim 17, wherein the components of the electrical circuit are clock-controlled components.

21. The electrical circuit as claimed in claim 20, wherein at least some of the components of the electrical circuit operate with different clock signals.

22. The electrical circuit as claimed in claim 21, wherein the clock signal with which the component which is carrying out the action operates is at the same or a lower frequency than the clock signal with which the component which is waiting for the action to be carried out operates.

23. The electrical circuit as claimed in claim 20, wherein the acknowledgement signal is produced during the period of the clock signal which is used by the waiting component, within which period or following which period the action which is being waited for by the waiting component is carried out.

24. The electrical circuit as claimed in claim 20, wherein the acknowledgement signal is produced during the period of the clock signal which is used by the waiting component, within which period or following which period the edge of the clock signal which is used by the component which is carrying out the action occurs, on whose occurrence the action is carried out.

25. The electrical circuit as claimed in claim 20, wherein the acknowledgement signal is produced taking into account a signal on the basis of which the clock signal is produced, which is used by the component which is carrying out the action.

26. The electrical circuit as claimed in claim 25, wherein the acknowledgement signal is produced by logic linking of the signal, on the basis of which the clock signal is produced, which is used by the component which is carrying out the action, and a selection signal supplied by the component which is waiting for the action to the component which is carrying out this action in order to signal to it that the component which is waiting for the action wishes to communicate with this component which is carrying out the action.

27. The electrical circuit as claimed in claim 17, wherein the component which is waiting for the action to be carried out uses the acknowledgement signal as confirmation that the action which is being waited for has been carried out.

28. The electrical circuit as claimed in claim 17, wherein the component which is waiting for the action to be carried out ends the waiting for the action in the clock period of the clock signal which is used by this component and which follows the period within which the relevant component is supplied with the acknowledgement signal.

29. The electrical circuit as claimed claim 17, wherein the acknowledgement signal is formed by a component of the electrical circuit which is not identical to the component which is carrying out the action whose completion is being waited for.

30. The electrical circuit as claimed in claim 17, wherein the acknowledgement signal is formed taking account of the enable signal.

31. The electrical circuit as claimed in claim 17, wherein the electrical circuit is an integrated circuit.

32. A programmable unit comprising:
a plurality of components which cooperate with one another; and
a clock generator for production of clock signals for the components of the programmable unit, wherein this clock generator includes a master clock generator, a clock control device and two or more clock signal generating devices, wherein:
the master clock generator produces a master clock signal and supplies the master clock signal to all of the clock signal generating devices,
the clock control device produces two or more enable signals, and each clock signal generating device is supplied with an enable signal, and
each of the clock signal generating devices includes means for allowing a fraction of the master clock signal which is governed by the enable signal to pass, wherein this signal is passed on as the clock signal to one or more components of the programmable unit, and
wherein a core of the programmable unit is supplied with an acknowledgement signal.

* * * * *